July 13, 1965 B. McADAMS 3,194,889

TIME DIVISION MULTIPLEX SYSTEM

Filed Dec. 23, 1960 4 Sheets-Sheet 1

INVENTOR.
BRUCE McADAMS
BY Alfred C. Hill
AGENT

INVENTOR.
BRUCE McADAMS
BY Alfred C. Hill
AGENT

INVENTOR.
BRUCE McADAMS
BY
Alfred C. Hill
AGENT

July 13, 1965 B. McADAMS 3,194,889

TIME DIVISION MULTIPLEX SYSTEM

Filed Dec. 23, 1960 4 Sheets-Sheet 4

INVENTOR.
BRUCE McADAMS

BY Alfred C. Hill

AGENT

3,194,889
TIME DIVISION MULTIPLEX SYSTEM

Bruce McAdams, Pompton Plains, N.J., assignor to International Telephone and Telegraph Corporation, Nutley, N.J., a corporation of Maryland Filed Dec. 23, 1960, Ser. No. 77,927
21 Claims. (Cl. 179—15)

This invention relates to pulse communication systems and more particularly to an improved time division multiplex system suitable for operation in conjunction with all transmission media and especially those transmission media capable of transmitting signals in the audio frequency range, such as telephone, direct current, or carrier transmission circuits and the like.

In prior art communication systems employing time division multiplex techniques, it is the practice of employing a source of base frequency signal which is coupled to two paths. The first path includes a marker or synchronizing signal generator to produce a distinctive signal for synchronization of the receiver with the transmitter. The second path includes a signal distributor to establish a first plurality of time sequential pulse trains, each of these pulse trains being appropriately modulated by the information. The resultant information modulated pulse trains and the synchronizing signal are then coupled to a common circuit to time interleave the synchronizing signal and the information modulated pulse trains to produce a time division multiplex signal. Transmission over audio frequency range transmission media of the thusly produced multiplex signal has in the past been accomplished by pulse modulating a suitable low frequency oscillator with the multiplex signal to thereby convey the information of the multiplex signal by the low frequency signal output of an oscillator provided solely for this purpose. The thusly transmitted multiplex signal has in the past been received at a distant location, converted to a pulse signal with the output from this converter being applied to two separate paths. The first of these paths includes a synchronizing signal detector to establish a basic frequency pulse train synchronized to the basic frequency signal of the transmitter which in turn produces through a distributor a second plurality of time sequential pulse trains. The second path includes a plurality of demodulators activated by the appropriate one of the second plurality of pulse trains to separate the appropriate one of the plurality of information modulated pulse trains from the received multiplex signal and demodulate same.

An object of this invention is to provide a time division multiplex system capable of operating in conjunction with low frequency transmission media resulting in a reduction of equipment relative to the equipment of the above-mentioned prior art in both the transmitter and receiver.

Another object of this invention is to provide a time division multiplex system including a transmitter having a single signal source cooperating to form an information modulated multiplex signal and to convey over the transmission media the information of the multiplex signal and a receiver including means responding to the information signals rather than the synchronizing signal of the multiplex signal to provide the base frequency signal for the receiver.

In accordance with the principles of this invention a source of base frequency signals activates a distributor to provide a first plurality of time sequential pulse trains. Logic circuitry responding to the first pulse train and another one of the pulse trains of the first plurality of pulse trains produces a synchronizing signal recurring every other frame. Information signals are coupled to individual logic circuits which are activated sequentially by all the pulse trains but the first to provide a plurality of information modulated pulse trains. The resulting pulse multiplex signal gates the base frequency signal onto the transmission media in accordance with the pattern of the multiplex signal for transmission to a receiver. Preferably the base frequency signal is a sine wave signal and, hence, the signals being transmitted are cycles of the sine wave signal following the pattern of the pulse multiplex signal. The transmitted multiplex signal is detected at the receiver and converted to a pulse multiplex signal. At least certain of the signals other than the synchronizing signal of the converted multiplex signal provides a base frequency pulse signal which activates a distributor to produce a second plurality of the time sequential pulse trains. Logic circuitry responding to the first pulse trains and another one of the pulse trains of the second plurality of pulse trains and the converted multiplex signal and an inverted counterpart thereof extract sequentially pulses of the base frequency pulse train applied to the distributor to cause the second plurality of pulse trains to be in time coincidence with an appropriate one of the signals of the received multiplex signal. Further logic circuits responding to associated ones of the second plurality of pulse trains, the converted multiplex signal and an inverted counterpart thereof cooperate to recover the information of the multiplex signal.

The above-mentioned and other features and objects of this invention will become more apparent by reference to the following description taken in conjunction with the accompanying drawings, in which.

Figure 1:
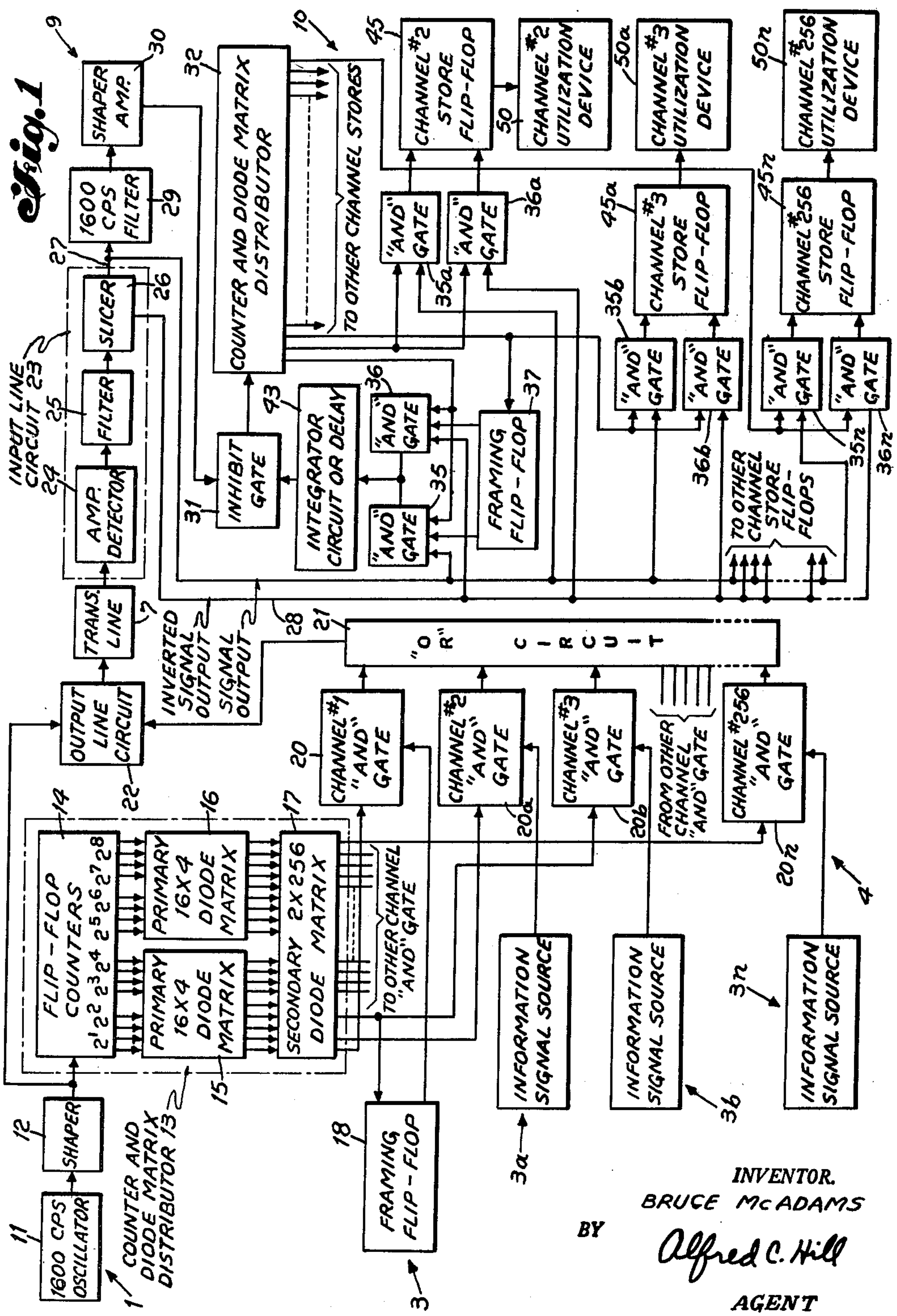
FIG. 1 is a schematic diagram in block form of a time division multiplex system in accordance with the plinciples of this invention.

Referring to FIG. 1, the transmitter of the time division multiplex system of this invention is illustrated to include a source of base frequency signal 1 having a given repetition frequency coupled to a means (distributor 13) to produce a plurality of time sequential pulse trains. A plurality of sources of information signals 3 have their outputs coupled to a means 4 responsive to the pulse trains of means to produce and the information signals of sources 3 to produce at the output thereof an information modulated time division multiplex signal. A means (circuit 22) is responsive to the multiplex signal and the base frequency signal of source 1 to convey the information of the multiplex signal by the base signal along a transmission medium, such as a transmission line 7, to a distant receiver. There is provided in the receiver a means (circuit 23) to receive the conveyed signal and a means 9 responsive to certain of the information signals of the received signal to provide a second plurality of time sequential pulse trains. A means 10 is responsive to the pulse trains at the output of means 9 and the received signal to sequentially recover the information signals transmitted from the transmitter.

To facilitate the understanding of the operation of the multiplex system of this invention an example of base frequency and other specifications relating to the transmitted signal will be employed for purposes of explanation. Let us assume a base frequency of 1600 cycles per second with 250 time slots per frame. Thus, each information signal will be sampled 6.25 times per second. To insure at least two samples per bit of signal information the minimum width of the signal bit must be approximately one-third second. To accomplish this, source 1 includes an oscillator 11 having a frequency of 1600 cycles per second and a frame duration of 0.16 second as illustrated in Curve A, FIG. 2. The sine wave output of oscillator 11 is coupled to shaper 12 to provide the base frequency pulse signal as illustrated in Curve B, FIG. 2. The resultant pulse signal at the output of shaper 12 is coupled to counter and diode matrix distributor 13 to provide the plurality of time sequential pulse trains. As illustrated in FIG. 1, counter and diode matrix distributor 13 includes eight flip-flop counters 14 connected in tandem so that the first flip-flop is triggered at 1600 cycles per second with the first flip-flop operating at 800 cycles per second, the second at 400 cycles per second, the third at 200 cycles per second, the fourth at 100 cycles per second, the fifth at 50 cycles per second, the sixth at 25 cycles per second, the seventh at 12.5 cycles per second, and eighth at 6.25 cycles per second. The outputs of counter 14 are combined in three diode matrices, primary matrices 15 and 16, and a secondary matrix 17. The output of the secondary matrix 17 will include 256 pulse trains with each of the pulses of the pulse trains being 0.625 millisecond wide. The resultant pulse trains are illustrated in Curves C, D, E, and F, FIG. 2. While it has been illustrated that three matrices are employed, it is possible to use other arrangements of logic circuitry to obtain the desired 256 pulse trains. For instance, if one matrix were used with eight inputs and 256 output signals, 8 x 256 or 2048 diodes will be required. However, with the arrangement illustrated, that is, two stages of logic circuits, 16 x 4 + 16 x 4 + 2 x 256 or 640 diodes are required. Thus, there is a saving in diodes even though it is accomplished at the expense of having two stages of logic in series between the output and the input of distributor 13. However, as is known counter 14 can drive well over this number of logic circuits.

The time sequential pulse train outputs of distributor 13 each are gated with another signal, either a framing signal, a timing signal or an intelligence signal. The framing signal is assigned to the first pulse train at the output of matrix 17 and is under control of flip-flop 18, one of the information sources 3. Flip-flop 18 is triggered once each frame from another pulse train output, such as the third pulse train output of matrix 17, and, thus, will reverse its conduction condition each frame as illustrated in Curve G, FIG. 2. When the output signal of flip-flop 18 is applied to a coincidence device, such as "AND" gate 20, there will be provided at the output thereof a pulse signal alternating between presence and absence, or "0" and "1," every frame as illustrated in Curve H, FIG. 2. This distinctive pattern will be recognized in the receiving equipment to provide the proper framing of the receiver equipment with the received signal. Certain of the information signals 3, preferably five, will be gated with five pulse trains from matrix 17 each frame so that sufficient timing information will be received at the receiver regardless of the condition of other signals in the multiplex signal. These timing signals provided from information sources 3 will have fixed level signals so that the coincidence devices of the appropriate channels will provide a pulse output each frame. Assuming one pulse train provides framing information and five pulse trains provide the timing information, the other 250 pulse trains will be coupled to other appropriate coincidence devices in the form of "AND" gate 20, so that the information in binary pulse coded form received from associated sources 3 as illustrated in Curves I, J, and K, FIG. 2, will provide other information modulated pulse trains at the output of the appropriate one of the "AND" gates 20. With this arrangement the signal of each information source 3 will have an individual time position in a frame with this known time position being utilized to distribute the pulse trains to the proper signalling or utilization equipment at the receiving end of the system.

Figure 2:
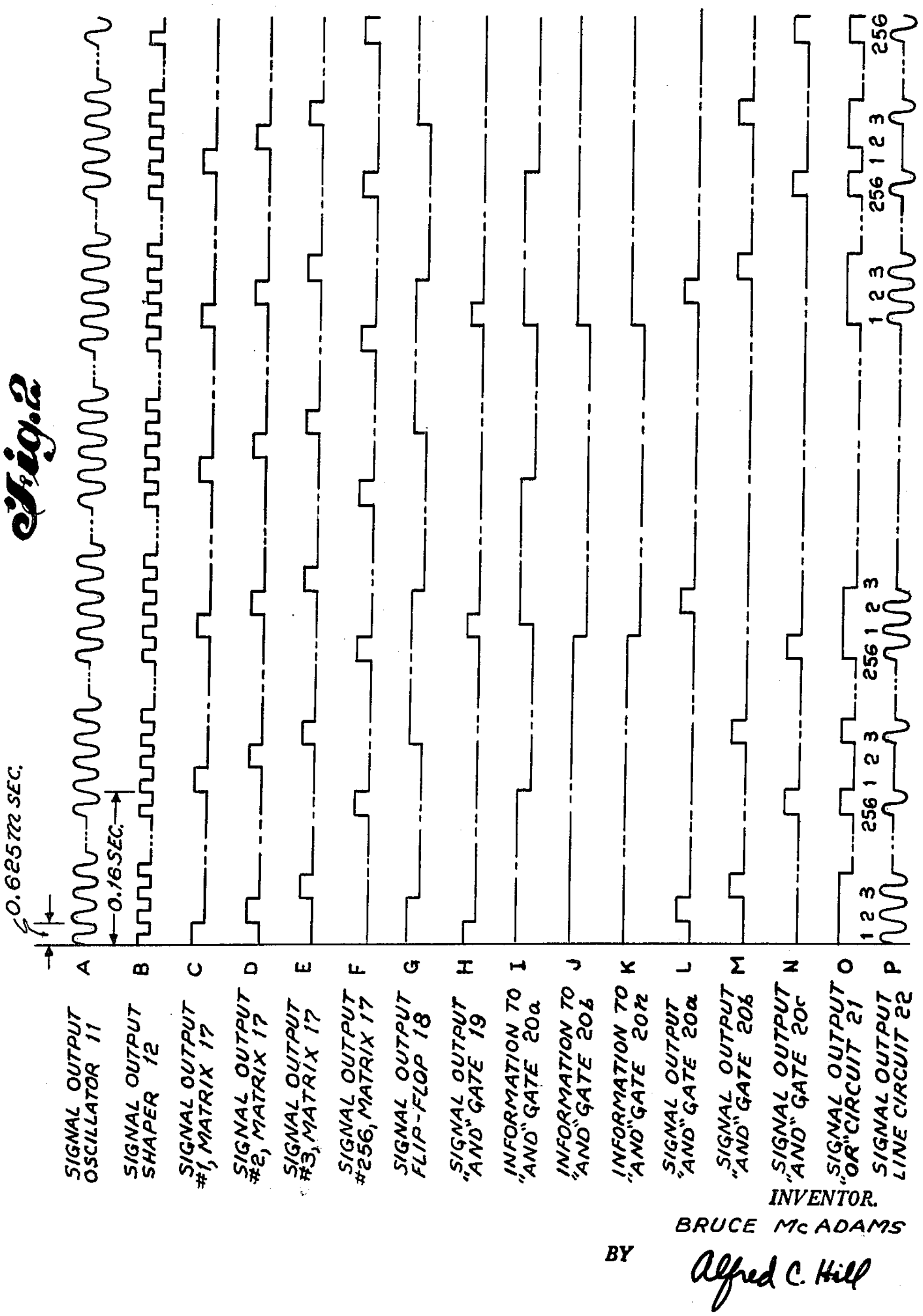
FIGS. 2 and 3 are timing diagrams useful in explaining the operation of the system of FIG. 1.
Figure 4:
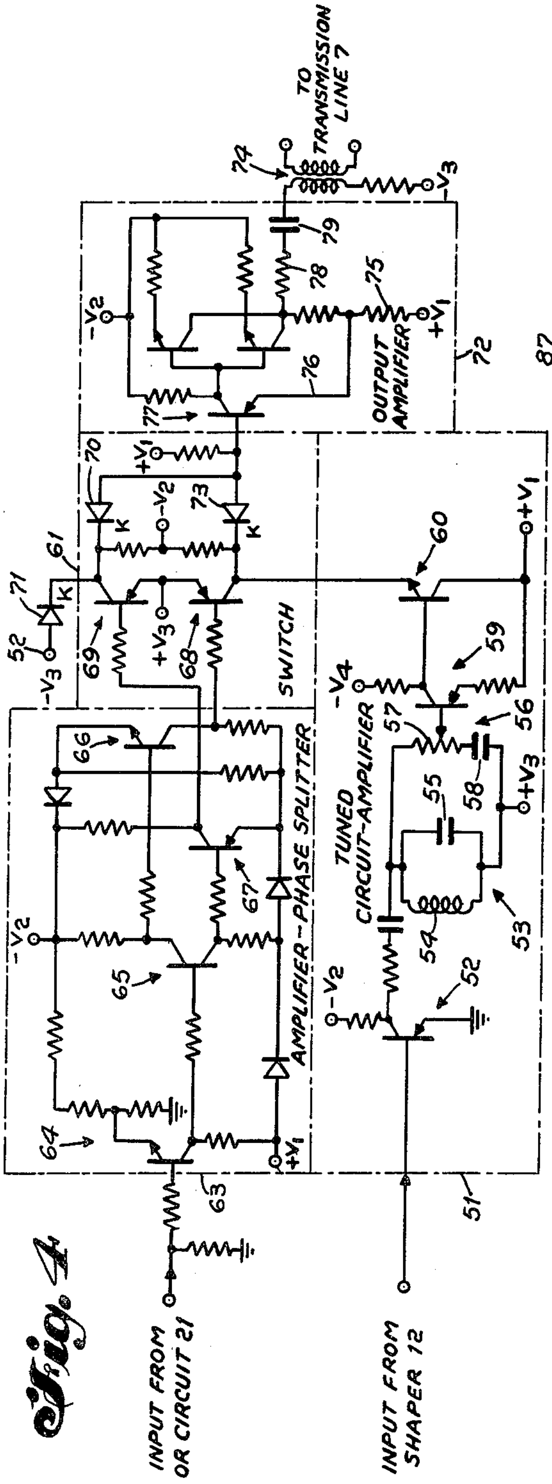
FIG. 4 is a schematic diagram of the output line circuit in the transmitter of FIG. 1.

The outputs of "AND" gates 20, illustrated in Curves L, M, and N, FIG. 2, are coupled to "OR" circuit 21 to provide a time division multiplex signal as illustrated in Curve O, FIG. 2, which in turn is coupled to a common output line circuit 22. Basically, circuit 22, described in greater detail in connection with FIG. 4, is a gate or coincidence circuit applying to the transmission medium illustrated as transmission line 7, the information of the multiplex signal output of circuit 21 in the form of the base frequency signal of source 1. More specifically, the pulse output of shaper 12 is coupled to circuit 22 to provide a 1600 cycle sine wave signal in synchronism with the output signal of oscillator 11. The circuit 22 then under control of the multiplex signal of circuit 21 passes in accordance with the pattern of the multiplex signal cycles of sine waves locked in synchronism with the signal of oscillator 11 to transmission line 7. The resultant output of circuit 22 is illustrated in Curve P, FIG. 2.

As illustrated in the curves of FIG. 2 and in accordance with the example employed herein, the width of the pulses of each pulse train is equal to the duration of a complete cycle of the sine wave signal of oscillator 11 and, thus for each pulse of the multiplex signal at the output of circuit 21 there is provided at the output of circuit 22 only a complete cycle of sine wave signal. However, the example employed herein is not meant to limit the system to those set forth in the example but rather the width of the pulses at the output of circuit 21 may be sufficient to incorporate more than one cycle of sine wave signal provided the receiver circuitry is adjusted to account for the number of cycles of sine wave signal sent per pulse.

Figure 3:
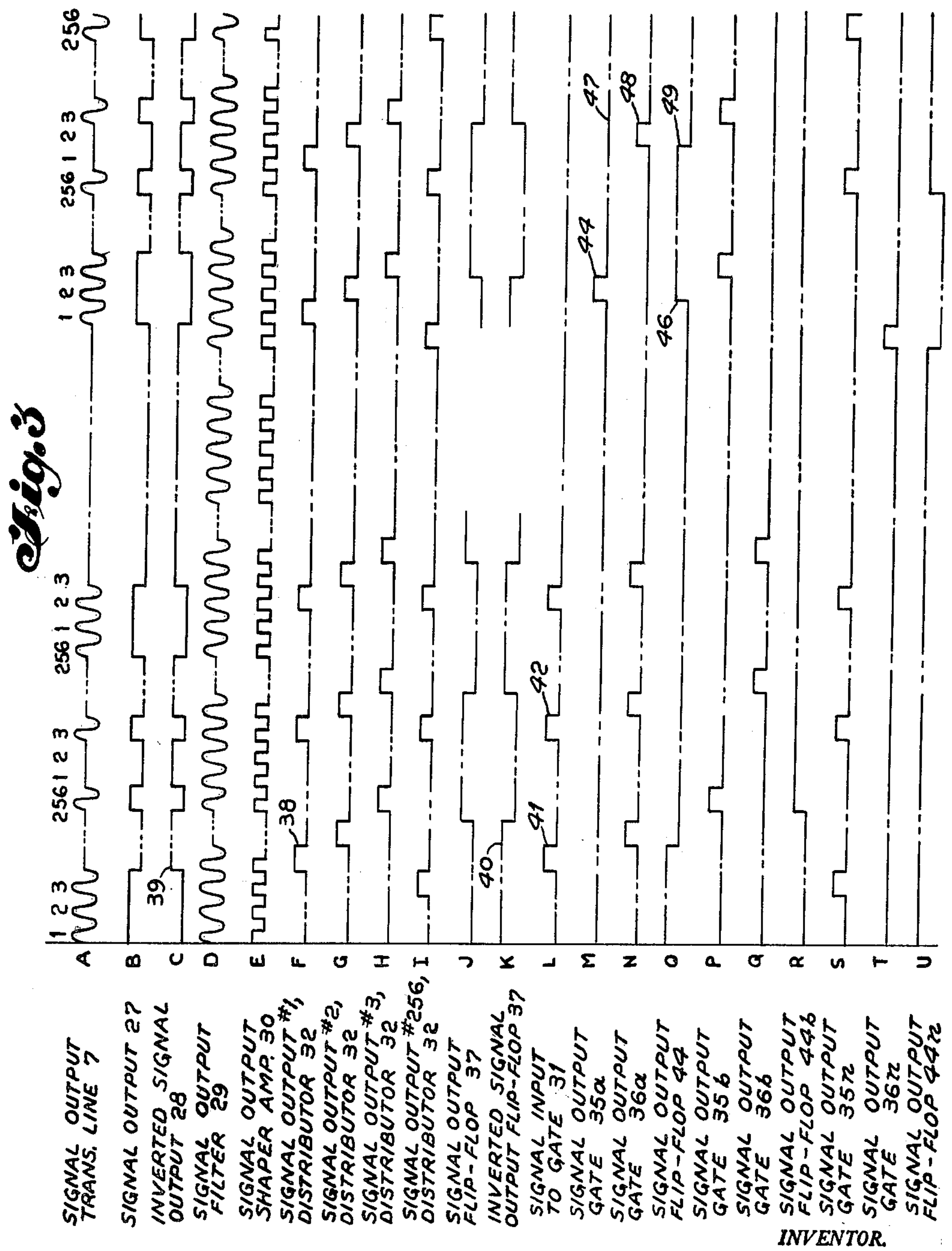

The signal coupled from circuit 22 to transmission line 7 is coupled to an input line circuit 23 with the input signal thereto having a configuration as illustrated in Curve A, FIG. 3, a duplicate of Curve P, FIG. 2. Circuit 23 includes an amplifier-detector 24 and a filter 25. Filter 25 is an integrating network to provide a smoothing effect upon the output of amplifier-detector 24. The output of filter 25 is applied to slicer 26 to provide at output 27 thereof a sliced version of the input signal as illustrated in Curve B, FIG. 3, and at output 28 thereof an inverted version of the signal at output 27 as illustrated in Curve C, FIG. 3. The output signal on output 27 is coupled to a filter 29 which should have a pass band of approximately ±20 cycles per second about a center frequency of 1600 cycles per second. Thus, filter 29 will respond to the 1600 cycle per second component of the incoming signal to provide a filtered 1600 cycle per second since wave signal as illustrated in Curve D, FIG. 3. This filtered component is applied to shaper-amplifier 30 resulting in a base frequency pulse train as illustrated in Curve E, FIG. 3. The incoming signal will always contain at least five cycles of 1600 cycles per second per frame due to the presence of the timing signals in each frame as previously explained in connection with the transmitter description. On the average, the 1600 cycle per second component will be larger due to the distribution of the multiplex signals. The output of shaper-amplifier 30 is the base frequency pulse train illustrated in Curve E, FIG. 3 and activates distributor 32 to produce the time sequential pulse trains in the receiver utilized to separate and recover the received information signals. Thus, it is observed that the base frequency signal in the receiver of this system is generated from all the information signals except the framing signal.

The output signal of shaper-amplifier 30 is coupled through an inhibit gate 31 to a counter and diode matrix distributor 32 incorporating the same equipment as described in connection with distributor 13 of the transmitter to produce the plurality of time sequential pulse trains required in the receiver as illustrated in Curves F, G, H, and I, FIG. 3. The first input of a pair of coincidence devices, illustrated as "AND" gates 35 and 36, are coupled to an associated one of the pulse trains of distributor 32. The second input of gates 35 is coupled to output 27 of slicer 26 and the second input of gates 36 is coupled to output 28 of slicer 26.

Gate 35 and gate 36 each have their first input coupled to the first output of distributor 32 to insure, in cooperation with other equipment, that the pulse train outputs of distributor 32 are time coincident with the appropriate signal of the received multiplex signal. The other equipment includes flip-flop 37 having two output circuits which are activated by a selected pulse train of distributor 32 to change the condition of the output signals of flip-flop 37 once each frame. The selected pulse train preferably is in the same time slot as the pulse train that activated flip-flop 18 of the transmitter. Thus, flip-flop 37 is activated by the third pulse train output of distributor 32. One output circuit of flip-flop 37 having a signal as illustrated in Curve J, FIG. 3, is the third input of gate 35 and the other output circuit of flip-flop 37 having a signal as illustrated in Curve K, FIG. 3, inverted with respect to the signal in the other output circuit, is coupled to the third input of gate 36. The resultant output signals of gates 35 and 36 are used to activate inhibit gate 31 so that each time the inhibit circuit receives a signal, the counter of distributor 32 drops back one count of the 1600 cycle pulses. This process is illustrated in Curves F, J, K and L, FIG. 3. It will be observed that the first pulse train, Curve F, FIG. 3, of distributor 32 is not in time coincidence with the first signal of the multiplex signal, Curve A, FIG. 3. Thus, the presence of pulse 38, Curve F, FIG. 3 at the first output of distributor 32, a "1" conduition 39 at output 28, Curve C, FIG. 3 and a "1" condition 40 in the inverted output of flip-flop 37 at the three inputs of gate 36, will produce an output pulse therefrom as illustrated by pulse 41, Curve L, FIG. 3. This pulse 41 is coupled to inhibit gate 31 to extract a pulse time coincident therewith from the base frequency pulse train output, Curve E, FIG. 3, at the input of distributor 32. The extraction of this one pulse did not accomplish the desired framing. Thus, another pulse, such as pulse 42, is produced to activate gate 31 to carry out the desired extraction of a pulse from the base frequency pulse train. As illustrated in FIG. 3, pulse 42 is produced by virtue of the fact that all three inputs of gate 35 are in a "1" condition as illustrated in Curves B, F, and J, FIG. 3, while at least one of the three inputs of gate 36 have present thereon a "0" condition as illustrated in Curves C, F, and K, FIG. 3. It will be recalled that in the transmitter equipment of FIG. 1, flip-flop 18 is provided to cause the output signal of channel 1 to reverse each frame. Thus, when the equipment is first turned "on," if the first output signal in distributor 32 does not occur at the time of the first signal of the multiplex signal, a signal to the inhibit gate 31 will be received on the average of at least every other frame. Thus, the distributor output signal continues to drop back one position of the incoming signal at least every two frames until the distributor output signal "1" condition and the incoming channel "1" condition coincide. Assuming the phasing of the flip-flop 18 in the transmitting equipment to be in a 180° phase relation with respect to flip-flop 37 of the receiving equipment, no outputs will be received from the gates 35 and 36 to inhibit the counter of distributor 32 and the receiving equipment will remain in synchronism until the equipment is turned "off" or the transmission path is interrupted.

If the phasing of the flip-flops 18 and 37 is not proper, the first time they coincide the counter will continue to drop back until a whole frame has been skipped. Due to this fact the receiving flip-flop 37 will receive one less count than the sending flip-flop and, therefore, the phasing must be correct. An integrating circuit 43 is provided between the output of gates 35 and 36 and the inhibit input of gate 31 to require more than one signal to inhibit the signal applied to distributor 32. This will guard against the loss of synchronism due to single errors caused by noise or other interference on the transmission media.

After framing is established the pair of gates 35*a*, 36*a* to 35*n*, 36*n* cooperate to recover the information signals contained in the received multiplex signal. Thus, if the signal in the time slot during which gates 35*a* and 36*a* are activated by a pulse train from distributor 32 is in a "1" condition, gate 35*a* will produce an output pulse 44 as illustrated in Curve M, FIG. 3, and thereby activate the channel flip-flop or bistable device 45 to set flip-flop 45 to a "1" condition as illustrated at 46 in Curve O, FIG. 3. If flip-flop 45 is already in the "1" condition the output pulse from gate 35*a* will have no effect. If the incoming signal is in a "0" condition at the time of activating gates 35*a* and 36*a*, no trigger will be produced at the output of gate 35*a*, as illustrated at 46 of Curve M, FIG. 3, but the inverted signal applied to gate 36*a* will be in a "1" condition so that a pulse 48 will be produced by gate 36*a* as illustrated in Curve N, FIG. 3 to set flip-flop 45 to a "0" condition as illustrated at 49 in Curve O, FIG. 3. Thus, the output signal from flip-flop 45 is set to the condition of the incoming signal at the time determined by the distributor signal output. The output signals of the various flip-flops 45 are coupled to associated utilization devices 50 which may take any desired form consistent with the desired communication and the information conveyed.

Referring to FIG. 4, one embodiment of the output line circuit 22 of FIG. 1 is illustrated in schematic form. The pulse output from shaper 12 of FIG. 1 is coupled to a tuned circuit-amplifier 51 including a transistor circuit 52 isolating the output circuit of shaper 12 from parallel tuned circuit 53 including inductance 54 and capacitor 55. The pulse input from shaper 12 rings tuned circuit 53 and produces a sine wave signal having a frequency of 1600 cycles per second that is locked in synchronism with the multiplex signal output of "OR" circuit 21. The sine wave output of tuned circuit 53 is coupled to a phase control circuit 56 including resistor 57 and condenser 58 to adjust the input signal to transistor 59 for the delay which may have been encountered in the counter circuits of distributor 13 of FIG. 1. The sine wave signal output of amplifier 59 is coupled to an emitter follower 60 for impedance matching purposes and, hence, to switch 61. Thus, the amplified sine wave signal of tuned circuit 53 provides one input for switch 61. A second input for switch 61 is a D.C. (direct current) voltage coupled to terminal 62 having a value equal to the D.C. base line voltage of the sine wave signals coupled from tuned circuit-amplifier 51 to thereby maintain a proper D.C. level output of the switch when the sine wave signal is not gated or passed through switch 61. The third input to switch 61, the input controlling the operation of the switch, is provided from amplifier-phase splitter 63. The input to amplifier-phase splitter 63 is coupled from "OR" circuit 21 and is the pulsed multiplex signal conveying the information of the information sources in the form of binary coded pulses. This multiplex signal is coupled to transistor amplifiers 64 and 65 connected in tandem. There are two outputs from amplifier 65, one taken from the collector electrode for application to amplifier 66 and the other output signal taken from the emitter electrode for application to amplifier 67. The output signals of amplifiers 66 and 67 are 180° out of phase with respect to each other and are coupled to the base electrode of the transistor amplifiers 68 and 69 of switch 61, respectively.

The operation of switch 61 in cooperation with amplifier-phase splitter 63 is as follows. Assume that the multiplex signal from circuit 21 is in the "1" condition. Due to the phase reversals that occur in amplifiers 64, 65, 66, and 67, we find that the signal applied to the input of amplifier 69 of switch 53 has the same phase relationship as the input signal applied to amplifier 64 and that the signal applied to the input of amplifier 68 has a phase opposite to the phase of the signal applied to the input of amplifier 64. Thus, under these conditions amplifier 69 has a positive signal applied to the base electrode enabling transistor 69 to conduct. The conduction of transistor 69 renders the collector of transistor 69 more positive than $-V_2$ and thereby biases diode 70 and diode 71 into nonconduction preventing the D.C. voltage from being applied to the output of switch 61 for application to output amplifier 72. On the other hand, amplifier 68 under the condition set forth hereinabove is rendered nonconductive thereby maintaining diode 73 conductive to pass a cycle of sine wave to the input of output amplifier 72. If, on the other hand, the input to amplifier 63 is a "0" condition, the signal input to amplifier 69 will maintain amplifier 69 nonconductive, rendering the voltage at the collector thereof substantially the same value as $-V_2$ permitting diodes 70 and 71 to pass the D.C. voltage from terminal 62 to the input of output amplifier 72. The "0" condition signal at the input of amplifier 68 renders the amplifier conductive, renders the collector thereof more positive than $-V_2$, and thereby biases diode 73 into nonconduction. This prevents any cycles of sine wave signal being applied to the input of amplifier 72. In this manner and through this mode of operation, switch 61 under control of the multiplex signal from "OR" circuit 21 will pass cycles of sine wave signal or a blank to the input of amplifier 73 in accordance with the pattern of the multiplex signal in the output of circuit 21.

The resultant coded cycles of sine wave signal are operated upon by output amplifier 72 for coupling through transformer 74 to transmission line 7, one form of transmission medium. Amplifier 72 is a transistor feedback amplifier including three transistors connected as illustrated providing a high input impedance and a low output impedance and a voltage gain of two. The required feedback is provided across resistor 75 for coupling along line 76 to the emitter of transistor 77. The signal output of the feedback amplifier is coupled by resistor 78 and condenser 79 to the primary winding of transformer 74 to provide an output impedance of approximately 600 ohms. With the arrangement illustrated, the output transformer 74 provides an output that is balanced with respect to ground.

The schematic diagram of FIG. 4 may be utilized in accordance with the principles of this invention for operation over telephone, direct current or carrier transmission circuits and may be utilized with carrier transmission equipment with nonsynchronized local oscillators. Under this later condition, the phase of the received signal is constantly rotating through 360° at a rate equal to the difference in frequency of the transmitter and receiver oscillators. Due to this condition of phase rotation the arrangement employing the signalling method of this invention wherein the base frequency signal is employed as the information carrier must be used since there is no dependence on the phase of the received signal. All that must be detected is the presence of a sine wave signal or the absence of a sine wave signal to detect the transmitted intelligence rather than the detection of both positive and negative transitions between "0" and "1" conditions which could be in error due to the phase rotation of nonsynchronous equipment.

Figure 5:
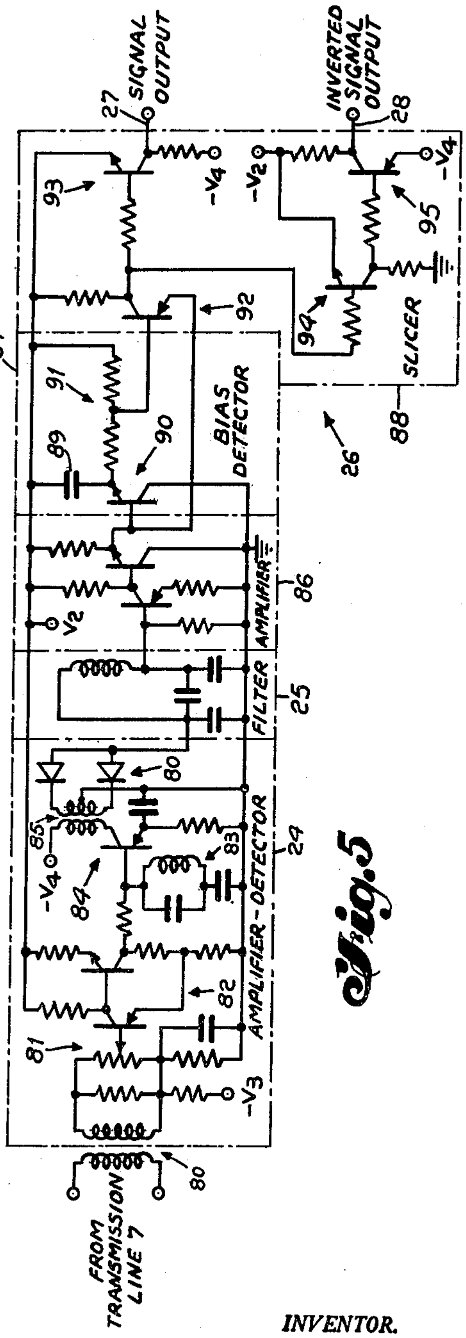
FIG. 5 is a schematic diagram of the input line circuit in the receiver of FIG. 1.

Referring to FIG. 5, there is illustrated schematically one embodiment of the input line circuit 23 of FIG. 1. The coded sine wave signal present on transmission line 7 from the output of line circuit 22 is applied to an input transformer 80 which is terminated in a potentiometer 81 to provide a constant input impedance and serve as a manual gain control for the input signal. A two-transistor amplifier 82 of the feedback type similar to the amplifier arrangement of output amplifier 72 of FIG. 4, operates upon the signal at the output of potentiometer 81. This arrangement provides a high input impedance to render the impedance across transformer 80 relatively independent of the gain control setting and provides a low output impedance to drive filter 83. Filter 83 is a band pass filter that transmits in accordance with the example employed herein the frequencies from 1000 to 3200 cycles per second and attenuates all other frequencies. Filter 83 thus has its band pass range limited to the frequencies in the center of the transmission band to thereby limit the bandwidth of the received signal to this frequency spectrum resulting in minimum delay distortion. Filter 83 also operates to limit the effective noise bandwidth and thus reduces the possibility of error. The signal output of filter 83 is coupled to amplifier 84 having a transformer 85 in the collection circuit thereof. The secondary winding of transformer 85 is center tapped and fed to a full-wave rectifier 86 operating to provide an output signal containing a constant amount of energy regardless of the phase of the signal. The output of rectifier 86 and, hence, amplifier-detector 24 is connected to a smoothing or integrating network in the form of filter 25 having an upper cut off frequency at 1200 cycles per second in accordance with the example employed herein. Thus, filter 25 has its frequency range adjusted to pass the fastest variation in the signals encountered, namely, 800 cycles per second but eliminates all transient components in the signal which occur above 2400 cycles per second since frequency doubling is obtained in full-wave rectifier 85.

The output of filter 25 is amplified in amplifier 86 and connected to a center slicing circuit 26 including a bias detector 87 and slicer 88. Center slicer 26 operates to reject all signal levels above and below the center slicing range which is approximately 0.2 volt high at half pulse amplitude. This prevents any noise below half the signal level from feeding through to give false signals. The object of this circuit is accomplished by bias detector 87 including a large condenser 89 that is charged to the peak signal value by a transistor 90 and a two-to-one voltage divider 91 connected across condenser 89. A direct current voltage equal to one half the peak signal is obtained from voltage divider 91 and is used to provide a base bias to a base amplifier 92. Only the signal levels above the bias provided by voltage divider 91 are amplified in amplifier 92. The output of amplifier 92 is coupled to a clipping amplifier 93 that amplifies only those signals at the output of amplifier 92 appearing in the range from the base line to approximately 0.2 volt above the base line. The output signal of amplifier 93 at the output 27 is a pulse having the same polarity as the input pulse applied to transformer 80 with a width equal to the width of the center of the pulse at the output of filter 25. The inverted version of the input signal as found in the output 28 is provided by coupling the output signal of amplifier 92 to an amplifier 94. The output signal of amplifier 94 will have all the characteristics as described hereinabove with respect to the output signal of amplifier 93. The output of amplifier 94 is then coupled to amplifier 95 to invert the output signal of amplifier 94 and thereby provide at output 28 a signal having a 180° phase relationship with respect to the output signal at output 27.

While I have described above the principles of my invention in connection with specific apparatus, it is to be clearly understood that this description is made only by way of example and not as a limitation to the scope of my invention as set forth in the objects thereof and in the accompanying claims.

I claim:

1. A time division multiplex system comprising a source of base frequency signal having a given repetition frequency, first means coupled to said base signal source responsive to said base signal to produce a first plurality of time sequential pulse trains, a plurality of sources of information signals, second means coupled to said first means and said sources of information signals responsive to said information signals and said first pulse trains to produce an information modulated time division multiplex signal, third means coupled to said base signal source and said second means responsive to said base signal and said multiplex signal to convey said multiplex signal by said base signal, fourth means coupled to said third means to receive said conveyed signal, fifth means coupled to said fourth means responsive to at least certain of said information signals of said received signal to provide a second plurality of time sequential pulse trains, and sixth means coupled to said fourth means and said fifth means responsive to said second pulse train and said received signal to sequentially recover said information signals.

2. A time division multiplex system comprising a source of sine wave signal having a given frequency, first means coupled to said sine wave signal source responsive to said sine wave signal to produce a first plurality of time sequential pulse trains, a plurality of sources of information signals, second means coupled to said first means and said sources of information signals responsive to said information signals and said first pulse trains to produce an information modulated time division multiplex signal, third means coupled to said sine wave signal source and said second means responsive to said sine wave signal and said multiplex signal to convey said multiplex signal by said sine wave signal, fourth means coupled to said third means to receive said conveyed signal, fifth means coupled to said fourth means responsive to at least certain of said information signals of said received signal to provide a second plurality of time sequential pulse trains, and sixth means coupled to said fifth means and said fourth means responsive to said second pulse trains and said received signal to sequentially recover said information signals.

3. A time division multiplex system comprising a source of sine wave signal having a given frequency, first means coupled to said sine wave signal source responsive to said sine wave signal to produce a first plurality of time sequential pulse trains, a plurality of sources of digital information signals, each digit of said information signals having one of two conditions, second means coupled to said first means and said sources of information signals responsive to the signals of said plurality of information sources and said time sequential pulse trains to produce a digital information time division multiplex signal, third means coupled to said sine wave signal sources and said second means responsive to said sine wave signal and said multiplex signal to convert the digital information of said multiplex signal to at least a cycle of said sine wave signal in the presence of a given one of said two conditions and no signal in the presence of the other of said two conditions, fourth means coupled to said third means for transmitting said converted multiplex signal, fifth means coupled to said fourth means to receive said converted multiplex signal, sixth means coupled to said fifth means responsive to at least certain of the information signals of said received signal to provide a second plurality of time sequential pulse trains, and seventh means coupled to said fifth means and said sixth means responsive to said second pulse trains and said received signal to sequentially recover said information signals.

4. A time division multiplex system comprising a source of sine wave signal having a given frequency, first means coupled to said sine wave signal source responsive to said sine wave signal to produce a first plurality of time sequential pulse trains, a plurality of sources of information signals, second means coupled to said first means responsive to at least one of said pulse trains to provide at least one synchronizing signal, third means coupled to said first means and said sources of information signals responsive to the signals of said plurality of information sources and others of said first pulse trains to produce information modulated pulse trains, fourth means coupled to said second means and said third means responsive to said synchronizing signal and said information modulated pulse trains to provide a time division multiplex signal including said synchronizing signal and said information modulated pulse trains, fifth means coupled to said fourth means and said sine wave signal source responsive to said multiplex signal and said sine wave signal to convert said synchronizing signal and said information modulated pulse trains to cycles of said sine wave signal for conveying the information of said multiplex signal, sixth means coupled to said fifth means to receive said conveyed signal, seventh means coupled to said sixth means responsive to at least certain of the information signals of said received signal to provide a second plurality of time sequential pulse trains, eighth means coupled to said sixth means and said seventh means responsive to the synchronizing signal of said received signal to render said second pulse trains time coincident with the appropriate ones of the signals of said received signal, and ninth means coupled to said sixth means and said seventh means responsive to said second pulse trains and said received signal to sequentially recover said information signals.

5. A time division multiplex system comprising a source of sine wave signal having a given frequency, first means coupled to said sine wave signal source responsive to said sine wave signal to produce a first plurality of time sequential pulse trains, a plurality of sources of binary coded pulses, means responsive to selected ones of said first pulse trains to provide at least one synchronizing signal, third means coupled to said first means and said sources of binary coded pulses responsive to said binary coded pulses and given ones of said first pulse trains to produce a plurality of binary coded pulse trains, fourth means coupled to said second means and said third means responsive to said synchronizing signal and said binary coded pulse trains to provide a time division multiplex signal including said synchronizing signal and said binary coded pulse trains, fifth means coupled to said sine wave signal source and said fourth means responsive to said sine wave signal and said multiplex signal to convert said binary coded pulse trains and said synchronizing signal to cycles of said sine wave signal, sixth means coupled to said fifth means to transmit said converted multiplex signal in the form of said cycles of said sine wave signal, seventh means coupled to said sixth means to receive said transmitted signal, eighth means coupled to said seventh means to convert said cycles of sine wave signal of said received signal to pulses, ninth means coupled to said eighth means responsive to at least certain of the binary coded pulse trains of said converted received signal to provide a base frequency signal having a frequency equal to said given frequency, tenth means coupled to said ninth means responsive to said base frequency signal to provide a second plurality of time sequential pulse trains, eleventh means coupled to said eighth means and said tenth means responsive to the synchronizing signal of said converted received signal to render said second pulse trains time coincident with the appropriate ones of the signals of said received signal, and twelfth means coupled to said eighth means and said tenth means responsive to said converted received signal and said second pulse trains to sequentially recover said binary coded pulses.

6. A time division multiplex system comprising a source of sine wave signal having a given frequency, first means coupled to said sine wave signal source responsive to said sine wave signal to produce a first plurality of time sequential pulse trains, a plurality of sources of binary coded pulses, a plurality of sources of timing pulses, second means coupled to said first means responsive to selected ones of said first pulse trains to provide a synchronizing signal, third means coupled to said sources of binary signals, said sources of timing signals and said first means responsive to said binary coded pulses, said timing pulses and given ones of said first time sequential pulse trains to produce a plurality of binary coded pulse trains and a plurality of timing pulse trains, a fourth means coupled to said second means and said third means to produce a time division multiplex signal including said synchronizing signal, said binary coded pulse trains and said timing pulse trains, fifth means coupled to said fourth means and said sine wave signal source responsive to said multiplex signal and said sine wave signal to convert said synchronizing signal, said binary coded pulse trains and said timing pulses trains to cycles of said sine wave signal, sixth means coupled to said fifth means to transmit said converted multiplex signal by means of said cycles of said sine wave signal, seventh means coupled to said sixth means to receive said transmitted signal, eighth means coupled to said seventh means to convert said received signal to pulses, ninth means coupled to said eighth means responsive to at least said timing pulse trains of said converted received signal to provide a second plurality of time sequential pulse trains, tenth means coupled to said eighth means and said ninth means responsive to said synchronizing signal of said converted received signal and selected ones of said second time sequential pulse trains to render said second time sequential pulse trains time coincident with the appropriate ones of said synchronizing signal and said pulse train of said converted received signal, and eleventh means coupled to said eighth means and said ninth means responsive to given ones of said second time sequential pulse trains and said converted received signal to sequentially recover said binary coded pulses.

7. A time division multiplex system comprising a source of first sine wave signal having a given frequency, first means coupled to first sine wave signal source responsive to said first sine wave signal to produce a first pulse signal having a repetition frequency equal to said given frequency, second means coupled to said first means responsive to said first pulse signal to produce a first plurality of time sequential pulse trains, a plurality of sources of binary coded pulses, a plurality of sources of timing signals, third means coupled to said second means responsive to selected ones of said first time sequential pulse trains to provide a synchronizing signal, fourth means coupled to said second means and said sources of binary coded pulses responsive to said binary coded pulses and given ones of said first time sequential pulse trains to produce a plurality of binary coded pulse trains, fifth means coupled to said second means and said sources of timing signals responsive to said timing signals and other given ones of said first time sequential pulse trains to produce a plurality of timing signal pulse trains, sixth means coupled to said third means, said fourth means and said fifth means to combine said synchronizing signal, said binary coded pulse trains and said timing signal pulse trains to provide a time division multiplex signal, seventh means coupled to said first means responsive to said first pulse signal to produce a second sine wave signal having a frequency equal to said given frequency, eighth means coupled to said seventh means and said sixth means responsive to said second sine wave signal and said multiplex signal to convert said multiplex pulse signal to the presence or absence of cycles of said second sine wave signal, ninth means coupled to said eighth means to transmit said converted multiplex signal, tenth means coupled to said ninth means to receive said converted multiplex signal, eleventh means coupled to said tenth means responsive to said received multiplex signal to convert the cycles of said second sine wave signal contained therein to pulses, twelfth means coupled to said eleventh means responsive to said timing signal pulse trains of said converted received signal to provide a second pulse signal having a repetition frequency equal to said given frequency, thirteenth means coupled to said twelfth means responsive to said second pulse signal to provide a second plurality of time sequential pulse trains, fourteenth means coupled to said eleventh means, said twelfth means and said thirteenth means responsive to said synchronizing signal and at least one of said second plurality of pulse trains to sequentially extract pulses from said second pulse signal until said second time sequential pulse trains are time coincident with the appropriate ones of said synchronizing signal, said binary coded pulse trains and said timing signal pulse trains of said converted received signal, and fifteenth means coupled to said eleventh means and said thirteenth means responsive to said second time sequential pulse trains and said converted received signal to sequentially recover said timing signals and said binary coded pulses.

8. A time division multiplex transmitter comprising a source of base frequency signal having a given repetition frequency, first means coupled to said base signal source responsive to said base signal to produce a plurality of time sequential pulse trains, a plurality of information sources, second means coupled to said first means and said plurality of information sources responsive to the signals of said plurality of information sources and said pulse trains to produce an information modulated time division multiplex signal, and third means coupled to said base signal source and said second means responsive to said base signal and said multiplex signal to convey the information of said multiplex signal by said base signal.

9. A time division multiplex transmitter comprising a source of sine wave signal having a given frequency, first means coupled to said sine wave signal source responsive to said sine wave signal to produce a plurality of time sequential pulse trains, a plurality of information sources, second means coupled to said first means and said plurality of information sources responsive to the output signals of said plurality of information sources and said pulse trains to produce an information modulated time division multiplex signal, and third means coupled to said sine wave signal source and said second means responsive to said sine wave signal and said multiplex signal to convey the information of said multiplex signal by said sine wave signal.

10. A time division multiplex transmitter comprising a source of sine wave signal having a given frequency, first means coupled to said sine wave signal source responsive to said sine wave signal to produce a plurality of time sequential pulse trains, a plurality of sources of digital information signals, each digit of said information signals having one of two conditions, second means coupled to said first means and said sources of information signals responsive to said information signals and said pulse trains to produce a digital information time division multiplex signal, and third means coupled to said sine wave signal source and said second means responsive to said multiplex signal to convert the digital information of said multiplex signal to at least a cycle of said sine wave signal in the presence of a given one of said two conditions and no signal in the presence of the other of said two conditions for transmission of said multiplex signal.

11. A time division multiplex transmitter comprising a source of sine wave signal having a given frequency, first means coupled to said sine wave signal source responsive to said sine wave signal to produce a plurality of time sequential pulse trains, a plurality of sources of digital information signals, each digit of said information signals conveying information by the presence or absence of a pulse having a width equal to the repetitious period of said given frequency, second means coupled to said sources of information signals and said first means responsive to said information signals and said pulse trains to produce a digital information time division multiplex signal, and third means coupled to said sine wave signal source and said second means responsive to said multiplex signal to convert the pulses of said multiplex signal to a cycle of said sine wave signal for transmission of said multiplex signal.

12. A time division multiplex transmitter comprising a source of base frequency signal having a given repetition frequency, first means coupled to said base signal source responsive to said base signal to produce a plurality of time sequential pulse trains, a plurality of sources of information signals, second means coupled to said first means responsive to selected ones of said pulse trains to provide at least one synchronizing signal, third means coupled to said first means and said sources of information signal responsive to said information signals and given ones of said pulse trains to produce a plurality of information modulated pulse trains, fourth means coupled to said second means and said third means to produce a time division multiplex signal including said synchronizing signal and said information modulated pulse trains, and fifth means coupled to said base signal source and said fourth means responsive to said multiplex signal and said base signal to convey the information of said multiplex signal by said base signal.

13. A time division multiplex transmitter comprising a source of sine wave signal having a given frequency, first means coupled to said sine wave signal source responsive to said sine wave signal to produce a plurality of time sequential pulse trains, a plurality of sources of information signals, second means coupled to said first means responsive to selected ones of said pulse trains to provide at least one synchronizing signal, third means coupled to said first means and said sources of information signals responsive to said information signals and given ones of said pulse trains to produce a plurality of information modulated pulse trains, fourth means coupled to said second means and said third means to produce a time division multiplex signal including said synchronizing signal and said information modulated pulse trains, and fifth means coupled to said sine wave signal source and said fourth means responsive to said multiplex signal and said sine wave signal to convey said synchronizing signal and said information modulated pulse trains by said sine wave signal.

14. A time division multiplex transmitter comprising a source of sine wave signal having a given frequency, first means coupled to said sine wave signal source responsive to said sine wave signal to produce in each of a receiving frame period a plurality of time sequential pulse trains, a plurality of sources of information signals, a bistable device coupled to said first means responsive to one of said pulse trains to change its conduction state once during each of said frame periods, a coincidence device coupled to said first means and said bistable device responsive to the first of said pulse trains and the output of said bistable device to provide a synchronizing signal occurring in alternate ones of said frame period, second means coupled to said sources of information signals and said first means responsive to said information signals and given ones of said pulse trains to generate a plurality of information modulated pulse trains, third means coupled to said coincidence device and said second means to produce a time division multiplex signal including said synchronizing signal and said information modulated pulse trains, and fourth means coupled to said sine wave signal source and said third means responsive to said multiplex signal to gate said sine wave signal to the output of said transmitter to convey the information of said multiplex signal by said sine wave signal.

15. A time division multiplex transmitter comprising a source of sine wave signal having a given frequency, first means coupled to said sine wave signal source to reshape said sine wave signal to provide a pulse signal having a repetition frequency equal to said given frequency, second means coupled to said first means responsive to said pulse signal to produce a plurality of time sequential pulse trains, a plurality of sources of information signals, third means coupled to said second means responsive to selected ones of said pulse trains to provide at least one synchronizing signal, fourth means coupled to said sources of information signals and said second means responsive to said information signals and given ones of said pulse trains to produce a plurality of information modulated pulse trains, fifth means coupled to said third means and said fourth means to produce a time division multiplex signal including said synchronizing signal and said information modulated pulse trains, sixth means coupled to said first means responsive to said pulse signal to generate a sine wave signal having a frequency equal to said given frequency, and a coincidence device coupled to said sixth means and said fifth means responsive to said multiplex signal to apply the information of said multiplex signal to the transmission media in the form of presence or absence of cycles of said generated sine wave signal.

16. A receiver for a time division multiplex signal having a plurality of information signals comprising first means to detect said multiplex signal, second means coupled to said first means responsive to at least certain of said information signals to provide a plurality of time sequential pulse trains, and third means coupled to said first means and said second means responsive to said pulse trains and said multiplex signal to sequentially recover said information signals.

17. A receiver for a time division multiplex signal having a synchronizing signal and a plurality of information signals comprising first means to detect said multiplex signal, second means coupled to first means responsive to at least certain of said information signals to provide a plurality of time sequential pulse trains, third means coupled to said first means and said second means responsive to said synchronizing signal and at least one of said pulse trains to render said pulse train time coincident with the appropriate ones of the signals of said multiplex signal, and fourth means coupled to said first means and said second means responsive to said pulse trains and said multiplex signal to sequentially recover said information signals.

18. A receiver for a time division multiplex signal including a synchronizing signal having a predetermined sequence of cycles of sine wave signal and a plurality of binary coded signals, the information of each of said coded signals being conveyed by the presence or absence of cycles of said sine wave signal comprising first means to detect said multiplex signal, second means coupled to said first means to reshape the cycles of said sine wave signal of said detected multiplex signal to provide a pulse multiplex signal, third means coupled to said second means responsive to at least certain of the coded signals of said pulse multiplex signal to provide a plurality of time sequential pulse trains, fourth means coupled to said second means and said third means responsive to the synchronizing signal of said pulse multiplex signal and selected ones of said pulse trains to render said pulse trains time coincident with the appropriate ones of the signals of said pulse multiplex signal, and fifth means coupled to said second means and said third means responsive to said pulse trains, said pulse multiplex signal and an inverted version of said pulse multiplex signal to sequentially recover said coded signals.

19. A receiver for a time division multiplex signal including a synchronizing signal having a predetermined sequence of cycles of a first sine wave signal, a plurality of binary coded signals, the information of each of said coded signals being conveyed by the presence or absence of cycles of said first sine wave signal, and a plurality of timing signals, the information of each of said timing signals being conveyed by the presence of cycles of said first sine wave signal comprising first means to detect said multiplex signal, second means coupled to said first means responsive to said detected multiplex signal to convert said detected multiplex signal into a pulse multiplex signal and an inverted version thereof, third means coupled to said second means responsive to at least the timing signals of said pulse multiplex signal to generate a second sine wave signal having a frequency equal to the frequency equal to the frequency of said first sine wave signal, fourth means coupled to said third means to provide a base frequency pulse train recurrent at a frequency equal to the frequency of said second sine wave signal, fifth means coupled to said fourth means responsive to said base frequency pulse train to provide a plurality of time sequential pulse trains, a plurality of pairs of coincidence devices, each of said coincidence devices having at least first and second inputs and an output, sixth means coupled between said fifth means and said pairs of coincidence devices to couple each of said plurality of pulse trains to said first input of each of said coincidence devices of an associated pair of said pairs of coincidence devices, seventh means coupled between said second means and said pairs of coincidence devices to couple said pulse mutliplex signal to said second input of one of said coincidence devices of each of said pairs of coincidence devices, eighth means coupled between said second means and said pairs of coincidence devices to couple said inverted pulse multiplex signal to said second input of the other of said coincidence devices of each of said pairs of coincidence devices, a first bistable device coupled to the outputs of each of said pairs of coincidence devices except one of said pairs of coincidence devices to recover and store the information of said coded signals, each of said coincidence devices of said one of said pairs of coincidence devices having a third input, a second bistable device having an input and two outputs, ninth means coupled between said fifth means and said second bistable device to couple a selected one of said plurality of pulse trains to said input of said second bistable device, tenth means coupled between said second bistable device and said one of said pairs of said coincidence devices to couple one output of said second bistable device to one of said third inputs, eleventh means coupled to said second bistable device and said one of said pairs of coincidence devices to couple the other output of said second bistable device to the other of said third inputs, and twelfth means coupled to said one of said pairs of coincidence devices and said fifth means to couple the outputs of said one of said pairs of coincidence devices to said fifth means to render said plurality of pulse trains time coincident with the appropriate ones of the signals of said multiplex signal.

20. A receiver for a time division multiplex signal including a synchronizing signal having a predetermined sequence of cycles of a first sine wave signal, a plurality of binary coded signals, the information of each of said coded signals being conveyed by the presence or absence of cycles of said first sine wave signal, and a plurality of timing signals, the information of each of said timing signals being conveyed by the presence of cycles of said first sine wave comprising first means to detect said multriplex signal, second means coupled to said first means responsive to said detected multiplex signal to convert said detected multiplex signal into a pulse multiplex signal and an inverted version thereof, third means coupled to said second means responsive to at least the timing signals of said pulse multiplex signal to generate a second sine wave signal having a frequency equal to the frequency of said first sine wave signal, fourth means coupled to said third means to provide a base frequency pulse train recurrent at a frequency equal to the frequency of said second sine wave signal, fifth means to produce a plurality of time sequential pulse trains in response to said base frequency pulse train, an inhibit gate coupled between said fourth means and fifth means to couple said base frequency pulse train to said fifth means, a plurality of pairs of coincidence devices, each of said coincidence devices having at least first and second inputs and an output, sixth means coupled between said fifth means and said pairs of coincidence devices to couple each of said plurality of pulse trains to said first input of each of said coincidence devices of an associated pair of said pairs of coincidence devices, seventh means coupled between said second means and said pairs of coincidence devices to couple said pulse multiplex signal to said second input of one of said coincidence devices of each of said pairs of coincidence devices, eighth means coupled to said second means and said pairs of coincidence devices to couple said inverted pulse multiplex signal to said second input of the other of said coincidence devices of each of said pairs of coincidence devices, a first bistable device coupled to the outputs of each of said pairs of coincidence devices except one of said pairs of coincidence devices to recover and store the information of said coded signals, each of said coincidence devices of said one of said pairs of coincidence devices having a third input, a second bistable device having an input and two outputs, ninth means coupled between said fifth means and said second bistable device to couple a selected one of said plurality of pulse trains to said input of said second bistable device, tenth means coupled between said second bistable device and said one of said pairs of coincidence devices to couple one output of said second bistable device to one of said third inputs, eleventh means coupled between said second bistable device and said one of said pairs of coincidence devices to couple the other output of said second bistable device to the other of said third inputs, and twelfth means coupled between said one of said pairs of coincidence devices and said inhibit gate to couple the outputs of said one of said pairs of coincidence devices to said inhibit gate to extract pulses from said base frequency pulse train to render said plurality of pulse trains time coincident with the appropriate ones of the signals of said multiplex signal.

21. A time division multiplex system comprising a source of first sine wave signal having a given frequency, first means coupled to said first sine wave signal source responsive to said first sine wave signal to produce in each of a receiving frame period a first plurality of time sequential pulse trains, a plurality of sources of binary code signals, a plurality of sources of timing signals, a first bistable device coupled to said first means responsive to one of said first time sequential pulse trains to change its conduction state once during each of said frame periods, a coincidence device coupled to said first means and said first bistable device responsive to the first of said first time sequential pulse trains and the output of said first bistable device to provide a synchronizing signal occurring in alternate ones of said frame period, second means coupled to said sources of binary code signals and said first means responsive to said binary coded signals and given ones of said first time sequential pulse trains to produce a plurality of binary coded pulse trains, third means coupled to said sources of timing signals and said first means responsive to said timing signals and other given ones of said first time sequential pulse trains to produce a plurality of timing signal pulse trains, fourth means coupled to said coincidence device, said second means and said third means responsive to said synchronizing signal, said binary coded pulse trains and said timing signal pulse trains to produce a time division multiplex signal including said synchronizing signal, said timing signal pulse trains and said binary coded pulse trains, a transmission medium, fifth means coupled to said first sine wave signal source and said fourth means responsive to said multiplex signal to gate said first sine wave signal to said transmission medium to convey the information of said multiplex signal by said first sine wave signal, sixth means coupled to said transmission medium to detect said multiplex signal, seventh means coupled to said sixth means responsive to said detected multiplex signal to convert said detected multiplex signal into a pulse multiplex signal and an inverted version thereof, eighth means coupled to said seventh means responsive to at least the timing signal pulse trains of said multiplex pulse signal to generate a second sine wave signal having a frequency equal to the frequency of said first sine wave signal, ninth means coupled to said eighth means to provide a base frequency pulse train recurrent at a frequency equal to the frequency of said second sine wave signal, tenth means to produce a second plurality of time sequential pulse trains in response to said base frequency pulse train, an inhibit gate coupled between said ninth means and said tenth means to couple said base frequency pulse train to said tenth means, a plurality of pairs of coincidence devices, each of said coincidence devices of said pair of coincidence devices having at least first and second inputs and an output, eleventh means coupled between said tenth means and said pairs of coincidence devices to couple each of said second time sequential pulse trains to said first input of each of said coincidence devices of an associated pair of said pairs of coincidence devices, twelfth means coupled between said seventh means and said pairs of coincidence devices to couple said said pulse multiplex signal to said second input of one of said coincidence devices of each of said pairs of coincidence devices, thirteenth means coupled between said seventh means and said pairs of coincidence devices to couple said inverted pulse multiplex signal to said second input of the other of said coincidence devices of each of said pairs of coincidence devices, a second bistable device coupled to the outputs of each of said pairs of coincidence devices except one of said pairs of coincidence devices to recover and store the information of said coded signals, each of said coincidence devices of said one of said pairs of coincidence devices having a third input, a third bistable device having an input and two outputs, fourteenth means coupled between said third bistable device and said tenth means to couple a selected one of said second time sequential pulse trains to said input of said third bistable device, fifteenth means coupled between said third bistable device and said one of said pairs of coincidence devices to couple one output of said third bistable device to one of said third inputs, sixteenth means coupled between said third bistable device and said one of said pairs of coincidence devices to couple the other output of said third bistable device to the other of said third inputs, and seventeenth means coupled between said one of said pairs of coincidence devices and said inhibit gate to couple the outputs of said one of said pairs of coincidence devices to said inhibit gate to extract pulses from said base frequency pulse train to render said second time sequential pulse trains time coincident with appropriate ones of said synchronizing signal, said timing signal pulse trains and said binary coded pulse trains of said multiplex signal.

References Cited by the Examiner

UNITED STATES PATENTS

| | | | |
|---|---|---|---|
| 2,403,210 | 7/46 | Butement et al. | 179—15 |
| 2,527,650 | 10/50 | Peterson | 179—15 |
| 2,874,216 | 2/59 | Scuitto | 178—66 |
| 3,067,291 | 12/62 | Lewinter | 179—15 |

DAVID G. REDINBAUGH, *Primary Examiner.*

L. MILLER ANDRUS, ROBERT ROSE, *Examiners.*